April 18, 1967  W. W. CLEMENTS  3,315,249
PROGRAMMED SIGNALLING SYSTEM
Filed Dec. 30, 1963  3 Sheets-Sheet 1

April 18, 1967     W. W. CLEMENTS     3,315,249

PROGRAMMED SIGNALLING SYSTEM

Filed Dec. 30, 1963     3 Sheets-Sheet 2

United States Patent Office 3,315,249
Patented Apr. 18, 1967

3,315,249
PROGRAMMED SIGNALLING SYSTEM
Warner W. Clements, Los Angeles, Calif.
(13435 Java Drive, Beverly Hills, Calif. 90210)
Filed Dec. 30, 1963, Ser. No. 334,245
4 Claims. (Cl. 340—329)

The invention relates to signalling systems for vehicles. More particularly, it relates to a system in which a plurality of vehicle horns are automatically sounded in a certain sequence. The operator of a vehicle incorporating the system need only depress his horn button (or appropriately actuate any corresponding horn control contactor) and the horns will sound in the sequence called for by the invention. The sounding of the horns may thus be said to be "programmed."

I am aware that in the prior art there exist other programmed horn systems. At least one of these is quite elaborate, enabling the vehicle operator to "play a tune" of several different notes simply by applying a steady manual pressure to his horn control contactor. The system of my invention differs from such prior-art systems in two respects: first, with regard to the specific program or "tune" which is incorporated; and second, with regard to the apparatus for energizing and de-energizing the respective horns in appropriate time sequence to reproduce the program. (This particular division of the apparatus will hereinafter be called the "programmer," or "programming switch."

Considering first the matter of the program itself, I have developed a program which is particularly suited for just two horns tuned at respective pitches, such a pair of horns being by far the most common complement of standard equipment on modern vehicles. According to my program, when the horn control contactor is closed (actuated) for a sufficient length of time, the two horns are sounded in alternating sequence for a short period, at the close of which the alternations of sound blend or merge in time, with both horns sounding continuously thereafter. I have found this particular program to be an unusually attention-compelling one, and one that is emotionally satisfying to the typical "horn tooter."

It should be mentioned that I contemplate the program being interrupted immediately when the operator removes his hand (or foot) from the control contactor. Thus, at his option, he can sound the whole sequence or only so many notes out of that sequence as he wishes. For instance, when only the first note or two is sounded, the effect is a comparatively quiet one and is thus suitable for warning nearby pedestrians. On the other hand, if a sustained blast from both horns is required, the point in the program where such occurs is quickly reached.

A further refinement of the program as already described is possible. I have noted that many animals, when expressing particular alarm or concern, will deliver the characteristic series of quacks, barks or whatever with the ejaculations coming faster and faster toward the end of the series. I have discovered that the principle of timing thus represented, if it be incorporated in the two-horn program, will produce a corresponding sound of urgency and thus will contribute to the overall attention-getting effect. It is an advantage of the invention that this accelerated-timing effect may be incorporated in the program, if desired, with the aid of a very simple structural modification which I have contrived. The arrangement not only enhances the sound produced, but it has another benefit as well: It permits the alternations to be slow enough at the beginning of the program so that the operator can get his hand off the control contactor, if he so desires, before more than one or two "beeps" have emanated from the horns. This is accomplished without sacrificing the later high rapidity of notes, even amounting to a warble if desired, which lends the sound of the program-as-a-whole much of its distinction.

Once given the type of program herein described, the relevant prior art would suggest that it be carried out by means of a stepping switch, a rotating-drum timer, or the like. The programmer I have devised is completely different from anything thus suggested. The time-sensing element of my programmer is a mechanical oscillatory system, including a movable mass and a means for exerting restoring force on said mass. Such oscillatory systems have previously been used for timing purposes, notably in the watch and clock art. But I have made a significant departure from even such an unrelated art, in that my invention does not contemplate that the oscillatory system shall be maintained in oscillation. Rather, it contemplates that the system shall be initially shock excited, after which the oscillations shall be permitted to die down. The dying-down is no mere incident of operation, but is an essential phase thereof.

It is an object of the invention to provide apparatus which will equip vehicles to project a novel, pleasing, and commanding sound for signalling purposes.

It is another object of the invention to provide apparatus which will permit the operator of a vehicle to selectively elicit, while using only the usual simple horn-control contactor, a useful range of differing signals from the vehicle's horns.

Further objects and advantages will be made evident by the descriptions of illustrative embodiments to follow.

Drawings

Figure 6:
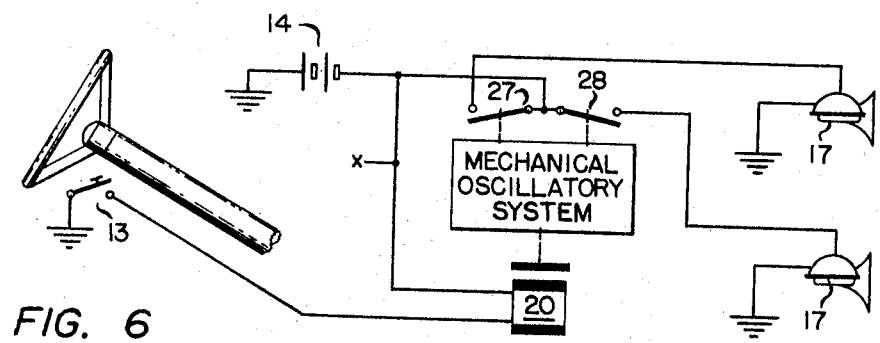
FIG. 6 is a schematic of the complete system in a second representative installation.
Figure 7:
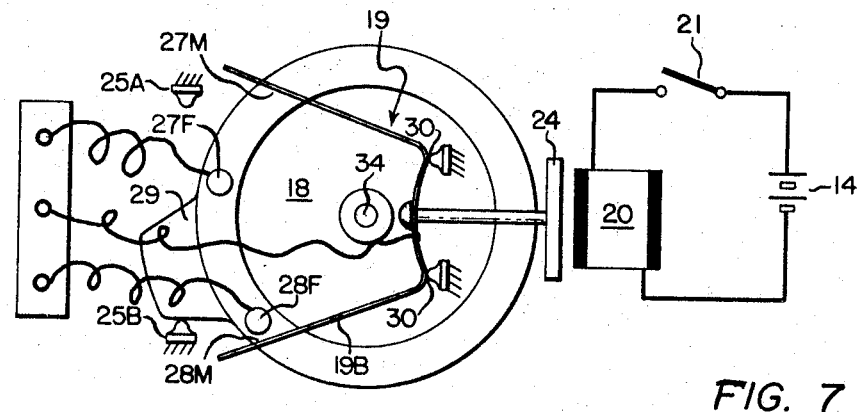
Figure 8:
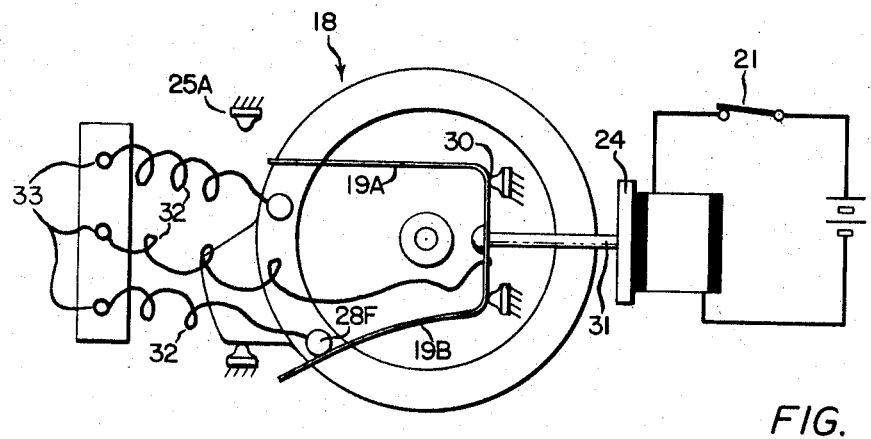
Figure 9:
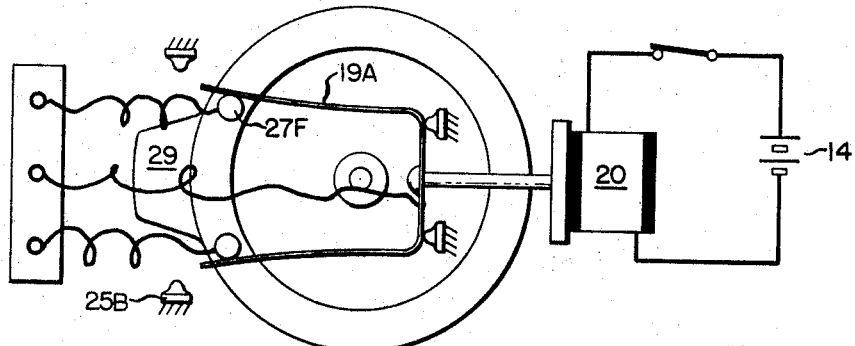

FIGS. 7 through 9 illustrate in simplified and somewhat diagrammatic form the construction of a programmer which embodies principles making it particularly suited for use in the installation of FIG. 6. The drawings should be taken as elevations, since gravity plays a part in the function of the device depicted. The respective drawings represent the device in successive stages of operation.

Figure 10:
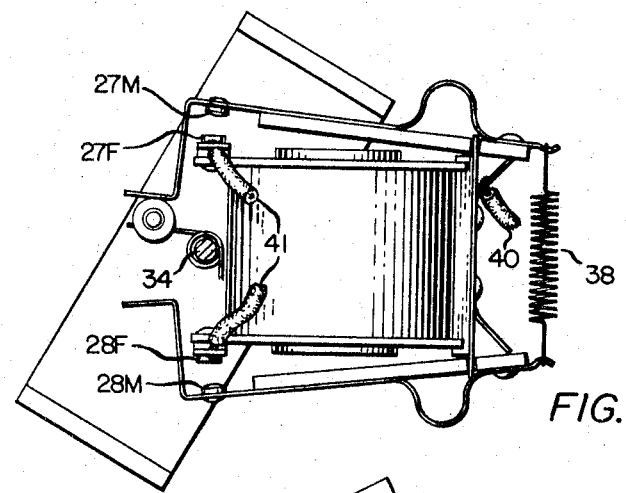
Figure 11:
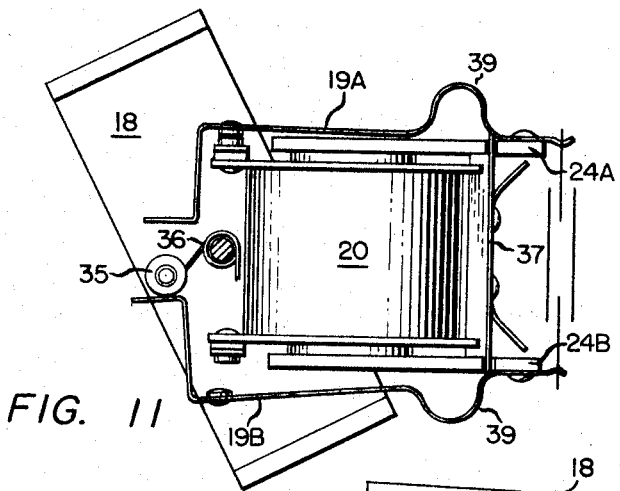
Figure 12:
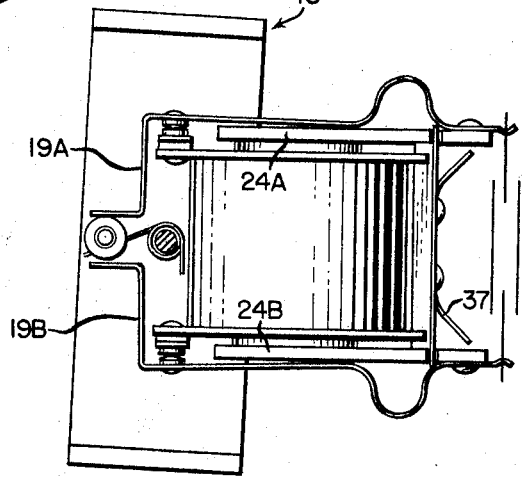

FIGS. 10 through 12 illustrate in specific and practical form a programmer which utilizes the principles exemplified by FIGS. 7 through 9, while also incorporating fresh improvements of its own. FIG. 10 depicts the device in quiescent condition. FIG. 11 shows it as it would appear a short time after being freshly energized, the rotor being at the peak of an early swing away from its quiescent position. FIG. 12 shows the device as it would appear while still energized, but after oscillations of the rotor 18 had died down. Each of these views is a projection in a plane lying between the base of the device and the device proper, the plane sectioning only rotor shaft 34 and minor supporting structure which is not shown. The views thus may be regarded as inverted plan views, although the device will work in any position. For the sake of simplicity, leads 40 and 41 and spring 38 are shown only in FIG. 10.

With regard to reference characters, in some cases corresponding components in differing embodiments have been given the same numbers. This has been done purposely in order to help the reader to quickly understand the rather large number of illustrative embodiments (or at least rudiments of same) presented. It is felt that the reader will be perfectly capable of telling the embodiments apart, but would welcome help in recognizing their similarities.

General construction and operation

Figure 1:
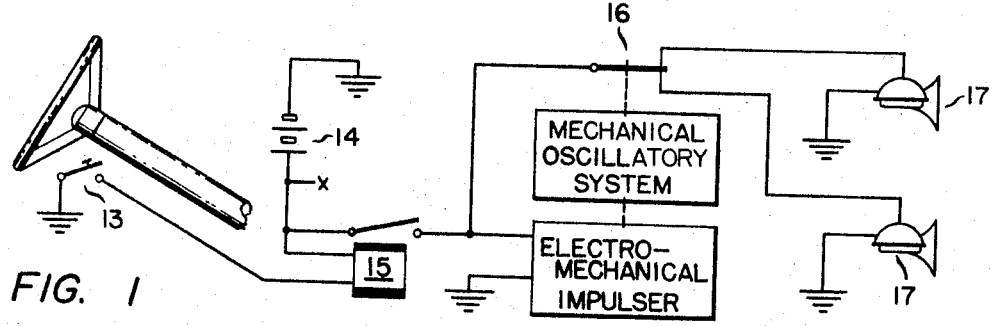
FIG. 1 is a schematic of the complete system in a first representative installation.

In FIG. 1, control contactor 13 corresponds with the "horn button" or similar device on one's automobile, or its equivalent on other vehicles. (The representation of a steering wheel nearby is intended only to identify the contactor in terms of its usual location; it is not intended to limit the location or, for that matter, to imply that the vehicle must necessarily be steered with a wheel.) The vehicle's power supply is represented by battery 14, whose polarity has no particular significance. The lead terminated at X is included to indicate that the battery may be connected to the vehicle's generator, not shown, and may also serve to power other and unrelated devices on the vehicle. A horn relay is indicated at 15. The horn programmer, already mentioned as an important division of the apparatus, comprises switch 16 along with the mechanical oscillatory system and the electromechanical impulser indicated by respective diagram blocks. Switch 16 is of the type known as S.P.D.T., center-position-shorting type. Its essential elements are its two sets of contacts, which are so arranged that when the blade or equivalent movable element is moved in one operational direction or the other (up or down in the drawings), one or the other of the two sets of contacts is caused to be open, while the other set is caused to be closed. When the blade is in its central position both sets are closed. As the schematic shows, each of the two sets of contacts is connected to conduct current, when closed, to a respective one of the two horns 17. (While the horn symbols in the schematic suggest discrete units, I fully contemplate that the horns may optionally be combined with the programmer components in a single structural unit.)

Figure 2:
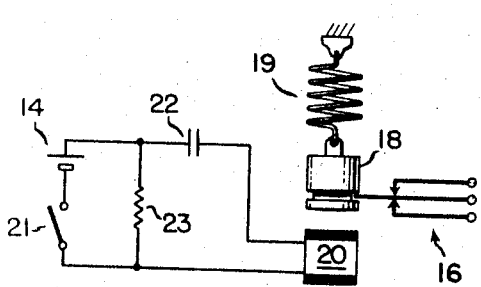
FIGS. 2 through 5 illustrate in highly diagrammatic form the principles of four respective programmers from among embodiments of same according to the invention which would be suitable for use in the installation of FIG. 1.
Figure 3:
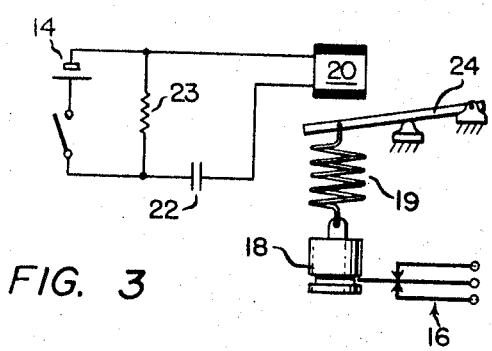

A mechanical oscillatory system need basically comprise no more than a mass 18 and a spring 19, as suggested by FIGS. 2 and 3. If switch 16 is coupled to the system in the mode indicated in the latter figures, it will be actuated whenever the mass oscillates up-and-down.

As for the electromechanical impulser, its basic function is to respond to electrical energization by delivering a mechanical push or kick to the aforesaid oscillatory system. Such a function can only be fulfilled with the aid of an electrical-to-mechanical energy transducer of some type, representative types being the piezoelectric, the electro-thermal-expansive, the electrodynamic, and the electromagnetic. In the present state of the transducer art, I find that the electromagnetic type gives the best money's worth for my purposes. Nevertheless, I regard the other types as clear equivalents. Assuming the use of the electromagnetic type, FIGS. 2 and 3 suggest two related ways in which this type may be employed. With either way, it is the pull of electromagnet 20 which is relied upon to excite the mechanical oscillatory system.

Attention is again directed to FIG. 1, wherein the arrangements whereby the oscillatory system is arranged to respond to the impulser, and the switch is arranged to respond to the oscillatory system, are signified by the dashed lines shown connecting the respective elements. The operation of the system will now be clear. When control contactor 13 is closed, relay 15 is energized, delivering current to the electromechanical impulser. The latter, in turn, jolts the oscillatory system into action, which in its turn starts oscillating the movable element of switch 16. Current from the power supply is thus delivered alternately to one and then the other of horns 17. This situation obtains as long as the horn control contactor is held closed and the oscillations persist. However, under normal circumstances the oscillations will die out relatively soon. (The period of their persistence is, of course, under the designer's control.) As soon as switch 16 ceases to be actuated and is allowed to remain in its center position it will thenceforth deliver current to both horns at once, until the supply of current is interrupted by the opening of the control switch and the horn relay. Since horns of all types, even air horns, are commonly arranged to sound only when they (or their controllers) are electrically energized, the desired programming will have been achieved, the horns first sounding alternately for a brief period and then together.

It must be mentioned that while oscillations still persist there is at least a brief instant twice in each cycle when both horns sound at once. That is to say, if one considers the respective periods in which the two horns sound it may be observed that said periods overlap. Moreover, as the stroke actuating the switch becomes shorter and shorter, the time of overlap becomes longer and longer until it embraces the whole of the cycle and both horns sound continuously. Thus, the horns don't just suddenly stop sounding alternately and start sounding continuously; there is, instead, a pleasing blending effect. This effect is under the control of the designer. He can, by altering the switch structure in obvious ways, make the blending noticeable from early in the program, or else delay its onset until just before the combined horn blast so that it will scarcely be noticeable at all.

To complete the description of the operation of the system, it is only necessary to add that if the control contactor be released by the operator (i.e., allowed to open) at any instant prior to the completion of the horn-alternating part of the program, the contacts of relay 15 will immediately open and the program will be cut off at whatever point it has reached, since current to switch 16 will be cut off and any subsequent actuation of the latter will have no effect.

Impulse considerations

As already stated, the function of the electromechanical impulser is to stock the mechanical oscillatory system into action when the control contactor is closed. The excitation or impulsing should take place at approximately the instant of the closing of the control circuit. But assuming that the operator wants to elicit something more than a very short beep, said circuit will necessarily be kept closed for an appreciable period of time. It is therefore necessary to consider the effect of continuing to electrically energize the impulser element subsequent to that instant when it delivers the initial mechanical impulse.

A study of just the mechanical parts of FIGS. 2 and 3 will confirm that a sudden onset of magnetic attraction at the indicated point in each case will, indeed, induce up-and-down oscillations of the mass. However, such a study will also show that, should the magnetic attraction continue unabated after its initial onset (which onset, strictly speaking, constitutes the "impulse"), then no apparent useful purpose would be served. On the contrary, the mechanical operation would be interfered with inasmuch as the mass would be biased to oscillate about a point removed, in a vertical sense, from neutral alignment with the switch. Accordingly, the switch would not function properly.

In view of the foregoing it can be concluded that the only obvious way to use an electromagnet to shock-excite a mechanical oscillatory system, as called for by the invention as thus far disclosed herein, is to arrange that the electrical energization of the electromagnet be only of short duration even when the control contactor is closed for longer periods. The skilled mechanic will be able to so-arrange without undue difficulty. The electrical circuits in FIGS. 2 and 3 represent one of the solutions he might use.

In said figures, switch 21 fulfills the combined functions of contactor 13 and relay 15, and is intended as a simplified or shorthand representation therefor. Capacitor 22 is initially discharged. When the switch is closed a surge of current rushes electromagnet 20 for a brief period until the capacitor is charged. As this current flows, the electromagnet exerts its pull, which pull ceases when the current does, and so amounts to a tug or jerk. No matter how long the switch remains subsequently closed, no more current will flow. When the switch is opened, the capacitor starts to discharge through resistor 23 and after a time reaches its initial discharged condition. The operation is then ready to repeat.

The value of the capacitor is so chosen that the magnetic attraction due to the charging current surge will persist for approximately one-fourth or less of the natural period of the oscillatory system. The value of the resistor is so chosen that no appreciable pull will be developed in the electromagnet by virtue of the discharge current.

Self-quenching arrangements

There are two characteristics of the arrangements of FIGS. 2 and 3 which are something less than desirable. First, the resistor-plus-capacitor, or other equivalent means for pulse forming in the electrical circuit, represents an added complication and expense. Second, if the control contactor be released (opened) by the operator early in the program the mechanical oscillations will still continue. If the contactor then be quickly closed again, the decaying mechanical and electrical energies may well be caught at such a point that the program cannot be started over at the beginning. If this happens, the sound produced will be unpredictable.

Figure 4:
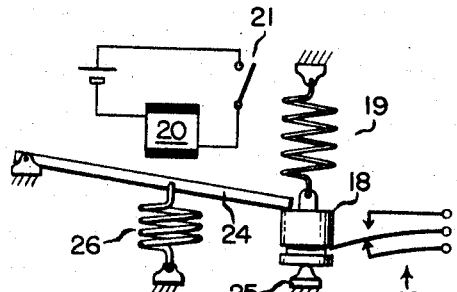
Figure 5:
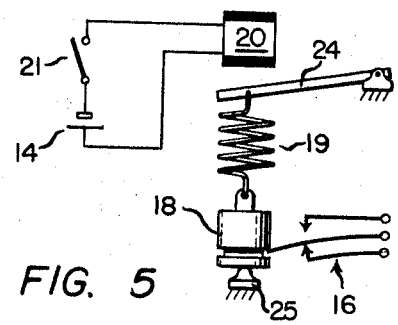

I have developed arrangements, exemplified by FIGS. 4 and 5, for overcoming both of the aforesaid disadvantageous characteristics at the same time. Once discovered and disclosed, the arrangements of the latter figures look very simple. The simplicity is, of course, one of their advantages.

In FIG. 4, mass 18 is shown held down against a quench stop 25 by armature 24, which is, in turn, held down by a strong auxiliary spring 26. The latter spring exerts more torque about the armature pivot than does oscillatory system spring 19. As shown, an extra stretch is imparted to the latter. In other words, the neutral position of the mass lies above that shown; specifically, it lies at the point where both sets of contacts of switch 16 would be closed. When the electromagnet is energized, the armature is attracted thereto and the mass is freed to start upward toward its neutral position. Due to its momentum, of course, it overshoots that position and the oscillation is established. Meanwhile, there being no pulse-forming components in the electrical circuit, the armature will stay out of the way of the mass, while the latter is bouncing and afterward, as long as switch 21 remains closed. At whatever point in the program the latter switch is re-opened, the armature will be released and will catch the armature wherever it may be, drawing it downward again to the position of the figure. Quench stop 25 is so constructed as to provide for minimal bounce. (A short bounce is not objectionable, and probably could not be avoided, in any event.)

The operation of FIG. 5 is somewhat similar, and should be self-evident in the light of the foregoing. The FIG. 5 arrangement has the added advantages of doing away with extra spring 26, and of requiring somewhat less pull from the electromagnet.

Self-relaying arrangement

It will be noted that FIG. 1 shows ground-return arrangements for all circuits. This is in accordance with actual practice on modern vehicles. The fact that the horn control contactor, in particular, is normally returned to ground has an important bearing upon the design of systems according to the invention. What it means is that there is no obvious way to eliminate the horn relay. Such elimination would seem to be indicated for the sake of economy, inasmuch as the programmer could take over the relay's function of allowing a small current in the horn contactor to control a large current to the horns themselves. But a study of FIG. 1 will fail to reveal any way in which the relay can be eliminated without eliminating one or more of the ground returns. That, in turn, would involve alteration in the construction of equipment which by now has become standardized. What stands in the way of the elimination of the relay is that under quiescent conditions one or both of the sets of contacts in switch 16 remains closed, and some means is necessary to keep the horn from sounding continuously.

The present disclosure includes a solution to the problem thus posed. As it affects the electrical circuit, the solution consists in providing two separately actuated switches to control the respective horns. Reference may be had to FIG. 6, wherein 27 and 28 are the two switches. These switches are so actuated that under quiescent conditions both are open; during the early part of the program both are closed alternately; and finally, provided that energization of electromagnet 20 persists, both are closed at once.

It remains to be explained how I can achieve this particular pattern of actuation of the switches, having only a single-degree-of-freedom oscillatory system with which to drive them. I have discovered that the feat may be accomplished through the use of an improved biasing means in the oscillatory system, along with an arrangement for actuating the two specified switches from the biasing means rather than directly from the mass. In the programmer as thus altered the biasing means does, however, continue to be the particular part of the oscillatory system which receives the actuation produced by the electromagnet, as is the case with the simple biasing means in FIG. 5.

At this point it is instructive to note that spring 19 in FIG. 5 is actually a movable spring, as contrasted with the corresponding spring in FIG. 4, which is a fixed spring. "Movable" and "fixed" as used here pertain to what might be called the "base of operations" of each spring. Reference to the figures will make it clear that moving, in this sense, and flexing are not quite the same thing. In FIG. 5, the spring is shown in non-operating position. Naturally, it has to be moved or advanced to get it into operating position. The moving is the task of the armature, and it is performed by drawing the upper end of the spring upward.

The self-relaying programmer uses for its oscillatory system a biasing means which is movable in the sense just described; however, it uses two springs to constitute this biasing means, rather than just one. The reason for using two springs it to permit the biasing means, when in non-operating position, to be completely disengaged from the mass. This cannot be accomplished with a single spring, which has both to push and to pull in order to exert its restoring force on the movable mass. But it can be accomplished with two springs, between which the work can be divided so that each has only to push (or alternatively, to pull). The engagement in each case thus being a unidirectional one, it is possible to pull back free therefrom.

To avoid awkward expressions I shall hereinafter use the word "advance" to mean "move into operating position," and I shall use the word "retract" to mean "move out of working position." "Advancement" and "retraction" must be understood to pertain to positioning as it affects function, and to have no direct reference to any particular degree or direction of travel.

It is clear that for the two springs to fulfill their function in the oscillatory system, the springs, when advanced, have to be arranged to bias the movable mass from mutually opposing directions toward a central position, that position being the median about which any oscillatory excursions are centered. The springs, of course, will not be arranged to buck one another. Rather, each will be arranged to have sole charge of the biasing whenever the mass is away from its median position in a respective direction, i.e., whenever the mass is in a respective sector of its range of travel. (I use the word "sector" here and hereinafter in a sense board enough to be applied in the case of any given mode of movement. Further, I fully contemplate that respective sectors may overlap to some extent.) To distinguish springs so employed, I shall call them "sector springs."

As each sector spring begins and ceases to exert bias, it is implicit that it has to make some sort of corresponding engagement and disengagement with the movable mass or extensions thereof. The resultant sequence of engagements will immediately be seen to be as follows: When the device is quiescent, the springs will be retracted, so that neither will be engaged. When the electromagnet is energized the springs will be advanced, the movable mass will be set to oscillating, and the springs will alternate engagement. When the oscillations have died down (assuming the device is still energized), the springs will remain advanced but will either be both engaged or both disengaged, as the design of the particular embodiment decrees. It will be noticed that this sequence corresponds with the sequence of program-switch closures which I previously specified as necessary for attaining the self-relaying action. It is not surprising, then, that is is possible to arranged for switches 27 and 28 to be actuated by (or even be partially constituted by) the respective sector springs in such a manner that the desired program is carried out.

The novel features that make self-relaying embodiments possible have thus been pointed out. Much remains to be explained, of course, about specifically how such embodiments are constructed and how they operate. For purposes of such explanation, attention is directed to the rudimentary programmer of FIGS. 7 through 9.

In the indicated embodiment, the particular motion permitted to the movable mass in the oscillatory system is a rotational motion. Accordingly, mass 18 can be characterized as a flywheel, or better, a rotor. As shown, this rotor is limited to a fixed degree of travel, namely, that between where tongue 29 strikes one and where it strikes the other of quench stops 25A and 25B. Since the normal mounting position of the embodiment is taken to be that which would make pivotal shaft 34 horizontal, the tongue unbalances the rotor, causing it to move, under quiescent conditions, to its extreme counterclockwise position.

The biasing means of the oscillatory system has the form of spring 19, made of strap metal spring material and fabricated to have a natural or relaxed shape approximating that of a W. When a spring of this shape is supported at points 30, and its middle curve is temporarily decreased by pressure applied centrally, its two arms 19A and 19B will be advanced inwardly toward each other. Anything that blocks that advance will be biased in that direction in which the given arm would go. Such a bias is exerted separately by each spring arm, so that operationally speaking each arm by itself constitutes an advancable sector spring. As shown, each bears on a respective one of pegs 27F and 28F. The central position of rotor 18 being the one which is shown in FIG. 9, it can be seen that the effect of advancing both of sector springs 19A and 19B is to urge the rotor (the movable mass) toward a position central of its permitted travel, each spring urging it from an opposite direction. Conversely, when part or all of the central pressure is released the two springs are retracted into their positions of FIG. 7, where they no longer exert bias on the movable mass.

With the construction shown, advancing the drive springs is simply a matter of energizing electromagnet 20. When switch 21 is closed, armature 24 is instantly attracted to the electromagnet and shaft 31 pulls flat the curvature at the joinder of the two sector springs, thus advancing them.

Two sets of switch contacts must be incorporated. There is a simple statement which generically describes the mounting arrangements of these sets: Each set is so mounted that it is closed only when the sector springs are in advanced position and the movable mass is in a respective sector of its permitted range of travel. This description permits of more than one specific arrangement. For immediate purposes, the arrangement to be detailed is a simple one. In the following section a different and somewhat improved arrangement will be dealt with.

In FIGS. 7 through 9, one set of contacts is constituted by contact surface 27M on the inner face of sector spring 19A, plus rotor peg 27F. It can be seen that for this set to be closed the sector springs must be advanced. Further, rotor 18 must be either in a position central of its travel or somewhere clockwise from that position. In other words, the rotor must be within that sector of its travel which is represented by the clockwise half, or slightly more, thereof. Similarly, the other set of contacts is constituted by surface 28M on the inside of sector spring 19B and by peg 28F. This second set of contacts is closed only when the drive springs are advanced and the rotor is in that sector of its travel represented by the counterclockwise half thereof, or slightly more. Pegs 27F and 28F must be insulated in some way from the rotor. Alternatively, the rotor itself may be constructed of an insulating material, such as hard rubber. Flexible wire leads, or pigtails, 32 make the connections between the respective contacts (all of which move in the course of operation) and fixed terminals 33, to which fixed terminals the appropriate external wiring is connected.

The mode of operation of the device follows inevitably from the construction just described, i.e., is inherent therein. If switch 21 be closed with the movable parts in their positions of FIG. 7, the armature, the pull shaft, and the sector springs will immediately spring to their positions of FIG. 8. In the latter figure the rotor is assumed to have had insufficient time to get started moving in response to the evident push from sector spring 19B. It soon will move, however, picking up speed as it goes until it passes its mid-travel position; there it loses the accelerating push from spring 19B and picks up a reverse push from spring 19A which will decelerate it. Eventually it will rebound, and rebound again, until all of the energy originally transmitted by the armature is lost in friction. The situation will then be that of FIG. 9, with all parts stationary, and will so remain until switch 21 is opened and the armature is released by the electromagnet. The inherent tension in the central portion of spring 19 will then retract the spring arms, or sector springs, and the armature. Released from all spring bias, the rotor will then be motivated only by its unbalance, and will revolve counterclockwise until tongue 29 meets the stop. All parts will then have reverted to their condition of FIG. 7.

Besides being self-relaying, the arrangement described is self-quenching. It is obviously impossible to sustain oscillations of a mass if there is no restoring force operative on that mass. If switch 21 be opened while oscillations are still in progress, the sector springs will immediately be retracted and the rotor will dissipate its energy against one or both of stops 25. The torque subsequently experienced by the rotor, that due to the gravitational unbalance about the pivot or axis, will normally be considerably less than that formerly developed by the sector springs. As a consequence, the recovery time required for the rotor to get back into starting position will, under some circumstances, be long compared to the period of oscillation (that is to say, the time of a single cycle). Even so, said recovery time will, in any event, always be much shorter than that time involved if it were required to wait for the oscillations to die down.

*Practical programmer*

The programmer to be described is simple, inexpensive, rugged, and reliable. Where one wishes to convert a conventional signalling installation on, say, an automobile to the system of the invention, this programmer will be the only component required (plus a few feet of wire) in order to do the job.

Reference should be had to FIGS. 10 through 12. Rotor 18, therein, is made of heavy strap metal, with flanges at either end bent toward the observer. It pivots on shaft 34, which shaft extends toward the observer and anchors on the mounting base of the device. (In the views, the base is considered to have been chopped off by the projection plane.) Two stops limit the travel of the rotor to that between its position of FIG. 10 and a position rotated counterclockwise to slightly beyond that of FIG. 11. (The stops lie beyond the visible parts and so are not shown.) A bearing roller 35, mounted on a stud extending from the rotor a short distance toward the observer, provides a low-friction drive point for the rotor. A small helical spring 36 bears with one end against the stud of the bearing roller and with the other end against fixed structure (not shown) with a comparatively light tension biasing the rotor to turn fully clockwise against its stop.

The electromechanical actuator of the embodiment comprises an electromagnet 20 and two armatures 24A and 24B. The electromagnet proper may be considered to comprise the usual core, coil, and fixed magnetic conductor extending along a side of same. (Wire connections to the coil are presumed, although these are not shown.) There is one departure from conventional construction, in that the electromagnet has two pole pieces, one at each end, instead of the usual single one. The armatures pivot on respective projections of a thin metal stamping 37 which serves various minor structural functions, including that of anchoring parts to the base through extensions not shown. This stamping is secured to the side magnetic conductor of the electromgnet. A spring 38 serves to hold both armatures, under quiescent conditions, in position retracted away from the pole pieces at distances limited by respective stops, said stops being provided in the form of additional projections from stamping 37.

Two sector springs, 19A and 19B, are preferably made of some material such as Phosphor bronze or beryllium copper. Each of these springs is mounted to a respective armature, being secured thereto at only one longitudinal point, namely, the point indicated by the rivet head near the pivot point in each case. Each spring is pretensioned, so that under quiescent conditions it is held flat against its armature. Most of the tension is caused to reside in loops 39. That is to say, in relaxed position the springs would have the same contour as that shown in the figures except that each loop would be more tightly closed and would form a greater portion of a circle. Likewise, most of the "give" when the springs are bent away from the armatures is caused to occur in these same loops. This latter effect is achieved by making the springs narrower, when viewed in their flat aspect, in the region of the loops. Preferably, the narrowing should be accomplished by the removal of material from the middle, in a lateral sense, of the spring material. In other words, the loops should appear in elevation each as two narrow straps. An inward extension of the free end of each sector spring is adapted to bear against roller 35.

Two sets of switch contacts are provided. One contact out of each of these two sets is mounted on a respective sector spring; these contacts are designated 27M and 28M. The other contact of each set is mounted to a respective flange of the electromagnet coil; the latter contacts are designated 27F and 28F. (The coil flanges are made of an insulating material such as fiber or plastic. In accordance with one common practice, such flanges may be integral with the bobbin on which the coil is wound.) Wire leads 40 and 41, shown broken short in FIG. 10, provide for connection to external apparatus. In an installation such as that of FIG. 6, lead 40 would eventually connect to the vehicle power supply, and leads 41 would connect to the respective horns. Lead 40, being connected to stamping 37, would preferably be augmented by a pair of pigtails connecting the stamping, in turn, to both sector springs. Such pigtails would overcome the effects of possibly poor contacts at armature pivot points. (For simplicity, no pigtals are shown.)

When the device is energized, the movable parts being in their quiescent positions of FIG. 10, the first thing that happens is that armature 24B is attracted to its pole piece, closing switch contacts 28M and 28F. Once this has occurred, the magnetic pull on the opposite armature is greatly increased, armature 24A thereby being enabled to close even against stiff bias from sector spring 19A. The latter spring resists because it must suffer its free end to stay put in space for the instant, the inertia of the rotor not permitting it move appreciably in the time it takes the armatures to close. Soon the rotor does move, however, and acquires enough speed so that its momentum takes it to the position of FIG. 11. Meanwhile, switch contacts 28M and 28F have opened again, and contacts 27M and 27F have closed. The switch closings alternate again and again until the oscillations die down, the armatures remaining glued to their respective pole pieces all the while. The situation after oscillations have died down is shown in FIG. 12 (which can also be regarded as depicting the earlier situation as the rotor, in full flight, coasts past its central position). De-energization, prior to or subsequent to the decay of oscillation, restores the conditions of FIG. 10.

The reader should carefully note that the embodiment of FIGS. 10 through 12, although it bears little superficial resemblance to the embodiment of FIGS. 7 through 9, is constructed and functions according to the same basic principles. It can be seen that the biggest physical difference between the two embodiments is that the later one employs its electromagnet to advance the sector springs through the attraction to said electromagnet of two armatures, one for each sector spring, rather than a single armature for both springs. On the level of principle it amounts to the same thing either way. In practical terms, however, the later-described arrangement has the advantage of being more compact, and of obviating the need for various joints and linkages which would be required in a practical adaptation of the earlier embodiment.

As to the differences in contact mounting between the same two embodiments, this is a relatively minor matter, either arrangement sufficing to meet the requirement that each set of contacts must be so mounted that it is closed only when the sector springs are advanced and the movable mass is in a respective sector of its travel. The present arrangement is probably more practical from an engineering standpoint.

There is, however, a third difference between the embodiments, a difference that basically affects the program produced. This third difference is the subject of the next section.

*Frequency-shifting feature*

In reviewing the programmers described herein, both in simplified rudimentary and in practical forms, the gains achieved by my improvements upon the already-inventive first-described embodiments will be recalled. Starting with the embodiments of FIGS. 2–3, the embodiments of FIGS. 4–5 added the feature of self quenching of oscillations, so that the program could be interrupted at any point and quickly begun again from the start. The embodiment of FIGS. 7–9 added the feature of self-relaying, so that the usual horn relay could be dispensed with in the system-as-a-whole. The illustrative embodiment of FIGS. 10–12 retained these features and added another not previously explained, namely, the ability to switch its two controlled circiuts faster and faster as the initial program progresses.

A basic feature of the invention that permits the attainment of this end is the employment of a damped train of oscillations, instead of steadily maintained oscillations, which last are inherently of constant period. However, even given the use of damped oscillations, it is not at all clear how such oscillations can be made to increase in frequency. Theoretically, it would require what is called "non-linear" behavior upon the part of the time-constant-determining components. But there are only three of these in the simple oscillatory system which otherwise suffices for purposes of the invention. Two must be ruled out: The resistance must be too small to have much effect on frequency, and the mass is inherently linear. That leaves only the restoring-force-producing agency as a possible source of the reyquisite non-linearity. Using a single spring, it would have to be one of a complex and tricky kind if it were to be made non-linear in the sense which would cause the frequency of oscillation to increase with a decrease in amplitude. However, I have discovered that by using two separate springs, one to exert the restoring force in each direction, and by then arranging that said springs should be pre-tensioned, the proper non-linearity will result and the desired program effect can be achieved.

What the pre-tensioning accomplishes is to ensure that the restoring force exerted upon the oscillatory mass, as the latter leaves its median position, does not increase at the same rate as does the distance travelled away from said position. Considering FIGS. 11 and 12, and remembering the pre-tensioning, it can be seen that the rotor encounters a high restoring force almost immediately upon leaving its central position. It can also be seen that this force will not increase too much when the rotor travels further. The practical result will be that when the oscillations are decaying and go from high to low amplitudes, the values of restoring force will not decline proportionately. This means that the smaller swings of the rotor will have to speed up in order to provide accelerations to match the inordinate force. The final result is the useful and attention-getting accelerating succession of honks of which I spoke early in this document.

*Definitions and design incidentals*

It naturally is desirable to keep the horn-alternating, or horn-warbling part of the program at a fairly constant length in time. What determines this length is the friction encountered by the moving mass in the oscillatory system. It may not be wise to depend upon the incidental friction normally encountered in pivots or other mass-suspension arrangements, because such friction can vary greatly with the accumulation of corrosion and/or dirt. Rather, it is better to design into the device provision for the introduction into the oscillatory system, when impulsed, of an ample amount of energy, and then to add extra friction in some form which will be dependably constant. I have found that a suitable friction device may consist simply of a nylon washer used to secure the rotor on its shaft, along with a small spring to load the washer.

It can be seen from FIGS. 10 through 12 that helical spring 36 doesn't have any particular function during such periods as the sector springs are advanced, but may nevertheless have to be reckoned with inasmuch as it bucks sector spring 19A. I recommend that if spring 36 is to be made quite stiff for any reason, then sector spring 10A should be made stiffer than sector spring 19B.

For vehicle use, it would ordinarily be desirable to provide an enclosure for the programmer and whatever is housed with it. The skilled mechanic will have no difficulty in designing such an enclosure. I might mention, however that I have found it perfectly satisfactory to leave the movable mass, which will usually be a rotor, outside of the enclosure for the sake of compact construction. If it is provided that the rotor shaft extend through the base of the housing, the cover of the device may be conveniently removed without removing the rotor.

By the word "program" I mean to denote a predetermined schedule for a coherent series of incidents in time, or the incidents according to that schedule. The only "incidents" to which the definition needs to apply in the present case are horn soundings and switch openings and closures.

As would follow from the foregoing, by the term "programming switch" I mean to denote any coherent mechanism including switch contacts and adapted to provide automatic opening and closing of those contacts according to a specified program.

What I claim is:
1. A signalling system for a vehicle provided with an electrical power source, said system comprising:
   a manually actuable horn control contactor;
   two horns;
   two sets of electrical switch contacts;
   electrically powered means for opening and closing the two sets of switch contacts in part or all of a programmed sequence according to which the respective sets are first closed intermittently and alternately and then continuously and together;
   connections for placing each of the sets of switch contacts in series with a respective one of the two horns and the power source at least at such times as the horn control contactor is in actuated condition;
   and connections for energizing the aforesaid electrically powered means from the electrical power source whenever and so long as the horn control contactor is in actuated condition.

2. The signalling system of claim 1 further characterized in that the programmed sequence imposed by the electrically powered means for opening and closing the switch contacts is one in which the openings and closings initially accelerate in time.

3. A signalling system for a vehicle provided with an electrical power source, said system comprising:
   a manually actuable horn control contactor;
   a passive mechanical oscillatory system adapted to respond to a discrete stimulating impulse by executing a decaying train of free oscillations, said oscillatory system comprising a movably mounted mass and means for biasing said mass toward predetermined positioning;
   electromagnetic means for applying one single and non-repeated stimulating impulse to the mechanical oscillatory system each time said electromagnetic means is energized electrically after a period of de-energization;
   connections for energizing the aforementioned electromagnetic means from the electrical power source continuously during any period in which the horn control contactor is actuated, to provide at least the start of a damped train of mechanical oscillations in the oscillatory system each time the horn control contactor is manually actuated afresh;
   two sets of electrical switch contacts connected to the mechanical oscillatory system to be alternately closed by the operational oscillations of said system and to be both closed after the dying out of oscillations in the presence of continuing energization of the electromagnetic means;
   two horns;
   and connections for placing each of the sets of switch contacts in series with a respective one of the horns and the power source at least at such times as the horn control contactor is in actuated condition,
   whereby appropriate actuation of the horn control contactor selectively elicits part or all of a program according to which the horns first sound intermittently and alternately and then continuously and together.

4. The signalling system of claim 3:

further including a quench stop bearing against the movable mass when the latter is in quiescent condition;

and further characterized in that the mechanical impulse from the electromechanical means is applied in the form of a bias change urging the movable mass away from the quench stop for the duration of electrical energization of said electromechanical means.

References Cited by the Examiner

UNITED STATES PATENTS

| 1,506,832 | 9/1924 | Hellmann | 340—331 |
| 2,069,915 | 2/1937 | Edwards et al. | 340—328 |
| 2,659,071 | 11/1953 | Dohm | 340—329 |
| 2,205,909 | 6/1940 | Place | 200—90 |
| 2,868,924 | 1/1959 | Hewitt et al. | 200—90 |

NEIL C. READ, *Primary Examiner.*

I. J. LEVIN, *Assistant Examiner.*